United States Patent
Browne et al.

(10) Patent No.: US 10,669,368 B2
(45) Date of Patent: Jun. 2, 2020

(54) METHOD TO INCREASE THE RESISTANCE OF DOUBLE METAL CYANIDE CATALYSTS TO DEACTIVATION

(71) Applicant: COVESTRO LLC, Pittsburgh, PA (US)

(72) Inventors: Edward P. Browne, Cologne (DE); Jose Pazos, Charleston, WV (US)

(73) Assignee: Covestro LLC, Pittsburgh, PA (US)

( * ) Notice: Subject to any disclaimer, the term of this patent is extended or adjusted under 35 U.S.C. 154(b) by 188 days.

(21) Appl. No.: 13/836,114

(22) Filed: Mar. 15, 2013

(65) Prior Publication Data
US 2014/0275313 A1    Sep. 18, 2014

(51) Int. Cl.
| | |
|---|---|
| *C08G 65/12* | (2006.01) |
| *C08G 18/48* | (2006.01) |
| *C08G 65/26* | (2006.01) |
| *C08G 65/08* | (2006.01) |
| *C08G 101/00* | (2006.01) |

(52) U.S. Cl.
CPC ..... *C08G 18/4866* (2013.01); *C08G 18/4829* (2013.01); *C08G 65/08* (2013.01); *C08G 65/12* (2013.01); *C08G 65/2609* (2013.01); *C08G 65/2663* (2013.01); *C08G 2101/00* (2013.01)

(58) Field of Classification Search
CPC .... C08G 65/08; C08G 65/12; C08G 65/2609; C08G 65/2663; C07C 41/03
See application file for complete search history.

(56) References Cited

U.S. PATENT DOCUMENTS

| | | | |
|---|---|---|---|
| 3,404,109 A * | 10/1968 | Milgrom | 568/607 |
| 3,829,505 A | 8/1974 | Herold | |
| 5,470,813 A | 11/1995 | Le-Khac | |
| 5,482,908 A | 1/1996 | Le-Khac | |
| 5,689,012 A | 11/1997 | Pazos et al. | |
| 5,767,323 A | 6/1998 | Televantos et al. | |
| 5,777,177 A | 7/1998 | Pazos | |
| 6,077,978 A | 6/2000 | McDaniel et al. | |
| 6,491,846 B1 | 12/2002 | Reese, II et al. | |
| 6,541,673 B1 * | 4/2003 | Rodriguez et al. | 568/633 |
| 7,919,575 B2 | 4/2011 | Browne | |
| 2003/0073873 A1 | 4/2003 | Brons et al. | |
| 2005/0209438 A1 * | 9/2005 | Browne | 528/414 |
| 2006/0079591 A1 | 4/2006 | Anderson et al. | |
| 2008/0021191 A1 * | 1/2008 | Reese et al. | 528/44 |
| 2010/0324340 A1 | 12/2010 | Pazos et al. | |
| 2012/0202963 A1 * | 8/2012 | Suzuki | C08G 65/2663 528/275 |

FOREIGN PATENT DOCUMENTS

WO     2014159551 A1    10/2014

* cited by examiner

*Primary Examiner* — Michael L Leonard
(74) *Attorney, Agent, or Firm* — N. Denise Brown

(57) ABSTRACT

This invention relates to a semi-batch process for the production of polyoxyalkylene polyether polyols. These polyoxyalkylene polyether polyols have hydroxyl (OH) numbers of from 112 to 400. This process comprises establishing oxyalkylation condition in a reactor in the presence of a DMC catalyst, continuously introducing alkylene oxide and a suitable starter into the reactor, and recovering an oxyalkyated polyether polyol. The oxyalkylation initially occurs at a temperature that is sufficiently high enough to avoid or prevent deactivation of the DMC catalyst, or for from 2% to 50% of the total oxide feed amount, and the oxyalkylation is then continued at a lower temperature.

9 Claims, No Drawings

US 10,669,368 B2

METHOD TO INCREASE THE RESISTANCE OF DOUBLE METAL CYANIDE CATALYSTS TO DEACTIVATION

BACKGROUND OF THE INVENTION

This invention relates to a semi-batch process for the production of polyoxyalkylene polyether polyols. These polyoxyalkylene polyether polyols have hydroxyl (OH) numbers of from 112 to 400, preferably from 125 to 350, and more preferably 150 to 325. This process comprises establishing oxyalkylation conditions in a reactor in the presence of a DMC catalyst, continuously introducing alkylene oxide and a suitable starter into the reactor, and recovering an oxyalkyated polyether polyol. The oxyalkylation initially occurs at a temperature that is sufficiently high to avoid or prevent deactivation of the DMC catalyst during the initial phase of the low molecular weight starter co-feed, and is then continued at a lower temperature. This invention also relates to polyurethane foams prepared from the polyoxyalkylene polyether polyols described herein and to a process for preparing these foams.

Base-catalyzed oxyalkylation has been used to prepare polyoxyalkylene polyols for many years. In such a process, a suitable hydroxyl group containing low molecular weight starter molecule, such as propylene glycol or glycerine, is oxyalkylated with one or more alkylene oxides; such as ethylene oxide or propylene oxide, to form a polyoxyalkylene polyether polyol product. Because it is possible to employ a low molecular weight starter, the build ratio (polyol weight/starter weight) is relatively high, and thus the process effectively utilizes reactor capacity. Strongly basic catalysts such as sodium hydroxide or potassium hydroxide are typically used in such oxyalkylations.

Thus, most of polyoxyalkylene polyols useful in synthesis of polyurethane polymers, as well as those suitable for other uses, contain substantial amounts of oxypropylene moieties. As those skilled in the art are aware, during base-catalyzed oxypropylation, a competing rearrangement of propylene oxide to allyl alcohol generates monofunctional species which also become oxyalkylated, producing a wide range of polyoxyalkylene monols with molecular weights ranging from that of allyl alcohol itself or its low molecular weight oxyalkylated oligomers to polyether monols of very high molecular weight. In addition to broadening the molecular weight distribution of the product, the continuous generation of monols lowers the product functionality. For example, a polyoxypropylene diol or triol of 2,000 Da equivalent weight may contain from 30 to 40 mole percent monol. The monol content lowers the functionality of the polyoxypropylene diols produced from their "nominal" or "theoretical" functionality of 2.0 to "actual" functionalities in the range of 1.6 to 1.7. In the case of triols, the functionality may range from 2.2 to 2.4. As the oxypropylation proceeds further, the functionality continues to decrease, and the molecular weight growth rate slows. For these reasons, the upper practical limit for base-catalyzed polyoxypropylene polyol equivalent weight is just above 2,000 Da. Even at those modest equivalent weights, the products are characterized by low actual functionality and broad molecular weight distribution.

The monol content of polyoxyalkylene polyols is typically calculated by measuring the unsaturation as described in, for example, ASTM D-2849-69, "Testing of Urethane Foam Polyol Raw Materials", as each monol molecule contains allylic termination. Levels of unsaturation of about 0.060 meq/g to in excess of 0.10 meq/g for based-catalyzed polyols such as those described above are generally obtained. Numerous attempts have been made to lower unsaturation, and hence monol content, but few were successful.

In the early 1960's, double metal cyanide ("DMC") complexes, such as the non-stoichiometric glyme complexes of zinc hexacyanocobaltate, were found which were able to prepare polyoxypropylene polyols with low monol contents, as reflected by unsaturation in the range of 0.018 to 0.020 meq/g. This represented a considerable improvement over the monol content obtainable by base catalysis.

In the 1970's, General Tire & Rubber Company, in U.S. Pat. No. 3,829,505, described the preparation of high molecular weight dials, trials etc., using double metal cyanide (DMC) catalysts. The low catalyst activity, coupled with catalyst cost and the difficulty of removing catalyst residues from the polyol product, prevented commercialization of the products.

In the 1980's, interest in DMC catalysts resurfaced, and improved DMC catalysts with higher activity coupled with improved methods of catalyst removal allowed commercialization for a short time. The polyols also exhibited somewhat lower monol content, with unsaturations in the range of 0.015 to 0.018 meq/g. However, the economics of the process were marginal, and in many cases, improvements expected in polymer products due to higher functionality and higher polyol molecular weight did not materialize.

In the 1990's, DMC catalysts were developed which exhibited much greater activity than was previously possible. Those catalysts, described for example in U.S. Pat. Nos. 5,470,813 and 5,482,908, allowed commercialization of DMC-catalyzed polyether polyols by ARCO Chemical Company under the ACCLAIM trade name. Unlike the low unsaturation (0.015-0.018 meq/g) polyols prepared by prior DMC catalysts, these ultra-low unsaturation polyols often demonstrated dramatic improvements in polymer properties, although formulations were often different from the formulations useful with conventional polyols. These polyols typically have unsaturation in the range of 0.002 to 0.008 meq/g.

As understood by the skilled artisan, one drawback of DMC-catalyzed oxyalkylation is the difficulty of using low molecular weight starters in polyether synthesis. Polyoxyalkylation of low molecular weight starters is generally sluggish, and often accompanied by catalyst deactivation. Thus, rather than employing low molecular weight starter molecules directly, oligomeric starters are prepared in a separate process by base-catalyzed oxypropylation of a low molecular weight starter to equivalent weights in the range of 200 Da to 700 Da or higher. Further oxyalkylation to the target molecular weight takes place in the presence of DMC catalysts. It is known, however, that strong bases deactivate DMC catalysts. Thus, the basic catalyst used in oligomeric starter preparation must be removed by methods such as neutralization, adsorption, ion exchange, and the like. Several such methods require prolonged filtration of viscous polyol. The additional steps required to remove catalyst from the oligomeric starter can add significant process time, and thus cost, to the overall process. Furthermore, the higher molecular weight of the starter lowers the build ratio of the process significantly, thereby decreasing reactor utilization.

Another drawback associated with oxyalkylation with DMC catalysts is that a very high molecular weight component (i.e. high molecular weight tail) is generally observed. The bulk of DMC-catalyzed polyol product molecules are contained in a relatively narrow molecular weight band, and thus DMC-catalyzed polyols exhibit very low polydispersities, generally 1.20 or less. However, it has been determined that a very small fraction of molecules, i.e., less than 1,000 ppm, have molecular weights in excess of 100,000 Da. This very small, but very high molecular weight, fraction is thought to be responsible for some of the anomalous properties observed with ultra-low unsaturation, high functionality polyols. These ultra high molecular weight molecules do not significantly alter the polydispersity, however, due to the extremely small amounts present.

U.S. Pat. Nos. 5,777,177 and 5,689,012, disclose that the high molecular weight "tail" in polyoxypropylene polyols may be minimized by continuous addition of starter ("CAOS") during oxyalkylation. In batch and semi-batch processes, low molecular weight starter, e.g., propylene glycol or dipropylene glycol, is added continuously as the polyoxyalkylation proceeds rather than all being added at the onset. The continued presence of low molecular weight species has been found to lower the amount of high molecular weight tail produced, while also increasing the build ratio, because a large proportion of the final polyol product is derived from low molecular weight starter itself. Surprisingly, the polydispersity remains low, contrary to an expected large broadening of molecular weight distribution. In the continuous addition process, continuous addition of starter during continuous rather than batch production was found to also result in less low molecular weight tail, while allowing a build ratio which approaches that formerly obtainable only by traditional semi-batch processing employing base catalysis.

The addition of glycerin or other low molecular weight starters can lead to sluggish reaction (as shown by higher reactor pressure) and frequently results in deactivation of DMC catalysts. It has also been found that low molecular weight starters such as glycerin, when employed in either the batch-type continuous addition of starter process, or the continuous-type continuous addition of starter process, are frequently not capable of forming a polyether of the desired molecular weight, or when such a polyether can be obtained, the product characteristics such as amount of high molecular weight tail, polydispersity, etc., are less than optimal. When preparing polyols in the low molecular weight range of about 260 to 2500, the ratio of glycerin or other low molecular weight starters to propylene oxide is higher than it is when making high molecular weight polyols. It appears that glycerin and other low molecular weight starters can act as inhibitors and stress the catalyst. Any other effects may be more evident under these stressed conditions. Because glycerine can be derived from plant or animal matter by base-dependent processes, it contains one or more basic contaminants which may cause a loss of DMC catalyst activity. This is recognized by McDaniel et al in U.S. Pat. No. 6,077,978. This reference discloses adding very small amounts (i.e., up to about 100 ppm) of acid to the glycerin initiator prior to its introduction into the reactor as continuously added starter to neutralize the basic contaminants. Even synthetic glycerin may have trace residues of base from the manufacturing process. Other methods described therein as useful include adsorption by acid adsorbents, and ion-exchange to either neutralize the impurities or to exchange them for acidic moieties. The addition of acid is the preferred method of U.S. Pat. No. 6,077,978 for increasing the DMC catalyst's ability to resist deactivation during CAOS feeds at high CAOS/oxide ratios.

U.S. Pat. No. 7,919,575 describes a process for preparing lower molecular weight DMC catalyzed polyols which requires the addition of excess acid to a CAOS feed stream. The amount of acid added is in excess over the amount required for neutralization of the basicity of a low molecular weight starter. This process may require less catalyst than was previously necessary. This process allows the manufacture of lower molecular weight DMC catalyzed polyols (i.e. 250 Da to 2500 Da) than is possible using non-acidified CAOS feeds. The amount of acid added is typically in excess of 100 ppm, based on the weight of the low molecular weight starter.

In spite of these recent advances in DMC catalysis and processes for preparing polyoxyalkylene polyols with DMC catalysts, other ways to avoid or prevent deactivation of DMC catalysts when using low molecular weight starters are highly desirable. New methods and processes for producing low molecular weight polyoxyalkylene polyether polyols from DMC catalysts from low molecular weight starters that do not require limiting the amount of water present in reactants are in demand.

Advantages of the present invention include the ability make low molecular weight polyols using DMC catalysis at low catalyst levels without having to control the water level in the glycerin (or other LMW starter) to a very low value.

SUMMARY OF THE INVENTION

This invention relates to a process for the production of polyoxyalkylene polyether polyols. More specifically, this invention is directed to a semi-batch process for producing polyoxyalkylene polyether polyols which have a hydroxyl number of from 112 to 400, preferably from 125 to 350, and more preferably from 150 to 325. This process comprises:
(1) establishing oxyalkylation conditions in an oxyalkylation reactor in the presence of a double metal cyanide catalyst;
(2) continuously introducing alkylene oxide and a low molecular weight starter into the reactor, wherein the starter has a number average molecular weight of from 30 to 200;
and
(3) recovering an oxyalkylated polyether polyol from the reactor;
wherein the oxyalkylation initially occurs at a sufficiently high temperature (preferably in the range of from greater than 135° C. to about 150° C.) for up to about 60 minutes and from 2 to 50% of the total oxide feed amount to prevent deactivation of the DMC catalyst, and then the oxyalkylation is continued at a temperature in the range of from 120° C. to 135° C. In accordance with the present invention, it is preferred that the oxyalkylation at the lower temperature continues at least until the CAOS feed is substantially complete, and more preferably at least until the CAOS feed is greater than or equal to 80% complete. After this point, the process becomes less prone to thermal deactivation, so the temperature may be raised, lowered or left as it was for the remainder of the batch.

DETAILED DESCRIPTION OF THE INVENTION

The present invention will now be described for purposes of illustration and not limitation. Except in the operating examples, or where otherwise indicated, all numbers expressing quantities, percentages, OH numbers, functionalities and so forth in the specification are understood to as being modified by the term "about". Equivalent weights and molecular weights given herein in Daltons (Da) are number average equivalent weights and number average molecular weights, respectively, unless otherwise indicated. All recited values are intended to be inclusive unless otherwise stated. Any combination of upper and lower limits of ranges may be used herein unless otherwise stated.

The term "establishing oxyalkylation conditions" in an oxyalkylation reactor as used herein is believed to be self-explanatory. Such conditions are established when the reactor temperature, alkylene oxide pressure, catalyst level, degree of catalyst activation, presence of oxyalkylatable compounds within the reactor, etc., are such that upon addition of unreacted alkylene oxide to the reactor, oxyalkylation takes place. As a non-limiting example, in the semi-batch version of continuous addition of starter, oxyalkylation conditions are initially established by following the procedures detailed in the working examples. By the term "continuously introducing" with respect to addition of alkylene oxide and a low molecular weight starter is meant truly continuous, or an incremental addition which provides substantially the same results as continuous addition of these components. The terms "starter" and "initiator" as used herein are the same unless otherwise indicated.

As used herein, the term "continuous" means a mode of addition of a relevant reactant in such a manner so as to maintain an effective concentration of the reactant substantially continuously. Continuous starter addition, for example, may be truly continuous, or may be in relatively closely spaced increments. It would not detract from the present process to incrementally add a reactant in such a manner that the added material's concentration decreases to essentially zero for some time prior to the next incremental addition. Incremental addition of reactant which does not substantially affect the nature of the product is still "continuous" as that term is used herein.

The semi-batch CAOS process for producing polyoxyalkylene polyether polyols involves establishing oxyalkylation conditions in an oxyalkylation reactor in the presence of a double metal cyanide (DMC) catalyst, continuously introducing alkylene oxide and a low molecular weight starter into the reaction, and recovering an oxyalkylated polyether polyol from the reactor. The low molecular weight starters have molecular weights ranging from 30 to 200, preferably from 40 to 150, and more preferably from 50 to 100. In this process, deactivation of the DMC catalyst is prevented by the initial oxyalkylation occurring at a temperature that is sufficiently high (preferably in the range of from greater than 135° C. to 150° C.) for a sufficiently long time period (i.e. up to about 60 minutes), and for from 2% to 50%, preferably for from 5 to 40% and more preferably for from 10 to 25%, of the total oxide feed amount. Then, the oxyalkylation is continued at a temperature in the range of from 120° C. to 135° C. The temperature transition can occur as a step change or it can occur in a linear or non-linear manner.

If the initial oxyalkylation occurs at too low or too high of a temperature, for too short of a time period or for too long of a time period, the DMC catalyst either does not activate or deactivates before completion of the process. Either of these does not form an acceptable polyoxyalkylene polyether polyol in the process. In addition, if the initial oxyalkylation at high temperature occurs for more or less than 2 to 50% of the total oxide feed amount, the DMC catalyst deactivates before completion of the process. This also does not form an acceptable polyoxyalkylene polyether polyol.

A "heel" may be used to initiate the reaction in the semi-batch process for producing polyoxyalkylene polyether polyols described herein. The "heel" may be an oligomeric product that was prepared separately by DMC catalysis or by other catalytic methods. It may also be an intermediate molecular weight takeoff from a batch reactor which was stored for later use, or it may be a portion of a full oxyalkylated product. Due to the unique nature of the continuous addition of starter process, the use of target weight product polyols can be used as the heel without broadening the molecular weight distribution of the products unacceptably. (The heel process does broaden the MW distribution appreciably. It is, however, acceptable. It appears that low molecular weight species are oxyalkylated much more rapidly than higher molecular weight species.)

In accordance with the present invention, suitable double metal cyanide (DMC) catalysts include virtually any DMC catalyst known in the art. These well-known catalysts are the reaction products of a water-soluble metal salt (e.g., zinc chloride) and a water-soluble metal cyanide salt (e.g., potassium hexacyanocobaltate). Preparation of suitable DMC catalysts is described in many references, including, for example, U.S. Pat. Nos. 5,158,922, 4,477,589, 3,427,334, 3,941,849, 5,470,813, and 5,482,908, the disclosures of which are incorporated herein by reference. Particularly preferred DMC catalysts are zinc hexacyanocobaltates.

Suitable DMC catalysts include an organic complexing agent. As set forth in the preceding references, the complexing agent is needed for an active catalyst. Preferred complexing agents are water-soluble heteroatom-containing organic compounds that can complex with the DMC compound. Particularly preferred complexing agents are water-soluble aliphatic alcohols. Tert-butyl alcohol is most preferred. The DMC catalyst may include, in addition to the organic complexing agent, a polyether, as is described in, for example, U.S. Pat. No. 5,482,908.

Preferred DMC catalysts for use in the process are highly active catalysts such as those described in U.S. Pat. Nos. 5,482,908 and 5,470,813. High activity allows the catalysts to be used at very low concentrations, preferably at concentrations low enough to overcome any need to remove the catalyst from the finished polyether polyol products.

The DMC catalyst concentration is sufficient so as to ensure good control of the polyoxyalkylation reaction under the given reaction conditions. The catalyst concentration is preferably in the range of from 0.0005 wt, % to 1 wt. %, more preferably in the range of from 0.001 to 0.1 wt. %, most preferably in the range from 0.002 to 0.02 wt. %, based on the amount of polyoxyalkylene polyether polyol to be produced. The DMC catalyst may be preset in the process of the present invention in an amount ranging between any combination of these values, inclusive of the recited values.

In general, any alkylene oxide which can be polymerized using DMC catalysis can be used in the process of the invention. Preferred alkylene oxides are ethylene oxide, propylene oxide, butylene oxides (e.g., 1,2-butylene oxide, isobutylene oxide), styrene oxide, and the like, and mixtures thereof in any ratio. Polymerization of epoxides using DMC catalysts and hydroxyl-containing starters gives polyether polyols, as is well understood in the art.

Other monomers that will copolymerize with an epoxide in the presence of a DMC catalyst can be included in the process of the invention to make other types of epoxide polymers. For example, epoxides copolymerize with oxetanes (as taught in U.S. Pat. No. 3,404,109) to give polyethers, or with anhydrides to give polyesters or polyetheresters (as taught in U.S. Pat. Nos. 5,145,883 and 3,538,043). Epoxides also react with carbon dioxide and an initiator to form polycarbonates. In particular, propylene oxide is reacted with carbon dioxide and an initiator to form a propylene oxide-carbon dioxide copolymer Suitable starters for continuous introduction into the process are low molecular weight starters which have number average molecular weights in the range of from 30 to 200, preferably 40 to 150 and most preferably 50 to 100. Examples of suitable low molecular weight starters include ethylene glycol, propylene glycol, glycerine, 1,3-butanediol, 1,4-butanediol, dipropylene glycol, trimethylolpropane, pentaerythritol, sorbitol, and the like, and mixtures thereof. Monofunctional starters are also suitable. Examples of such monofunctional starters include ethanol, propanol, butanol, etc. Mixtures of low molecular weight starters may also be used herein. A preferred mixture of low molecular weight starters for the present invention comprises propylene glycol and glycerin.

The low molecular weight starters to be continuously added in accordance with the present invention may contain water. These low molecular weight starters preferably contain from 50 to 6000 ppm water, more preferably 100 to 5000 ppm of water, and most preferably 500 to 2500 ppm of water, based on the weight of the low molecular weight starter.

In addition, the low molecular weight starters herein may be acidified. It may also be possible (though not required) to add an amount of acid in excess of that which is required to merely neutralize the basicity of the low molecular weight starter. Acid may be added in the range of 0 to 2000 ppm. Acidification of the low molecular weight starter typically occurs prior to its introduction into the reactor.

Virtually any organic or inorganic acid may be used in the process of the present invention. Suitable acids include, but are not limited to, the mineral acids and the organic carboxylic acids, phosphonic acids, sulfonic acids, and other acids. Phosphoric acid is preferred as a mineral acid, whereas citric acid and 1,3,5-benzene tricarboxylic acids may be useful as organic acids. Acid derivatives which are reactive with bases, such as acid chlorides and acid anhydrides and the like, are also useful. Organic acids such as phosphonic acids, sulfonic acids, e.g., p-toluene-sulfonic acid, and the like, may also be used. Examples of mineral acids which are suitable include hydrochloric acid, hydrobromic acid, and sulfuric acid, among others, while useful carboxylic acids or their acidifying derivatives include formic acid, oxalic acid, citric acid, acetic acid, maleic acid, maleic anhydride, succinic acid, succinic anhydride, adipic acid, adipoyl chloride, adipic anhydride, and the like. Inorganic acid precursors such as thionyl chloride, phosphorous trichloride, carbonyl chloride, sulfur trioxide, thionyl chloride phosphorus pentoxide, phosphorous oxytrichloride, and the like are considered as mineral acids herein.

The quantity of acid that is added to the low molecular weight starters may be in excess of the amount needed to neutralize the basicity of a low molecular weight starter such as, for example, glycerin. In the present invention, the quantity of acid preferably ranges from 0 to 2000, more preferably from 10 to 1000 and most preferably from 30 to 200 ppm, based on the weight of the low molecular weight starter. The acid may be added in the process of the present invention in an amount ranging between any combination of the above-recited values, inclusive of the recited values.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

A 28 liter pressure reactor was equipped with an agitator (configuration with Rushton blade on bottom and pitched blades on upper portion), baffles and multiple feed systems. All feed systems enter the reaction mixture in the liquid phase below the bottom agitator blade, process control, heat/cooling through internal coils or a jacket, safety relief system and vacuum capability. The catalyst used in the Examples was a double metal cyanide ("DMC") catalyst made according to U.S. Pat. No. 5,482,908, the disclosure of which is herein incorporated by reference.

The following materials were used in the examples:
Polyol 1: a refined polyether polyol having a molecular weight of about 700, a functionality of about 3 and an OH number of about 240, prepared by propoxylating glycerin in the presence of a KOH catalyst Comparative Example 1

Alkoxylation Temperature 130° C.

The reactor system was purged with nitrogen and evacuated, then Polyol 1 (2000 grams) was charged to the reactor along with DMC catalyst (0.48 grams) to give a final concentration of 30 ppm catalyst in the product. The reactor was inerted with nitrogen and heated to 130° C. The system was vacuum stripped for 30 minutes at 130° C. with a nitrogen purge. The nitrogen purge was stopped and the reactor was blocked in under vacuum, maintaining the reactor temperature at 130° C., and propylene oxide (100 grams) was added to activate the catalyst.

After the reactor pressure decreased, the PO feed was restarted and ramped to the final feed rate. The max PO feed rate was 70.9 grams/min. After 125 grams of PO had been fed, propylene glycol was started at a feed rate of 1.65 g/min. After 1194 grams of PO was fed, the glycerin feed containing 1500 ppm water and 240 ppm phosphoric acid was started at a feed rate of 12.15 g/min. The pressure at the start of the glycerin feed was 17 psia. The pressure steadily increased over the next 15 minutes until reaching a pressure of 75 psia at which point all feeds were stopped, the oxide lines were purged with nitrogen into the reactor, and the batch was abandoned owing to high reactor pressure. Less than 2000 g of the planned oxide addition amount of 12153 g had been charged at this point.

Comparative Example 2

Alkoxylation Temperature 145° C.

The reactor system was purged with nitrogen and evacuated, the Polyol 1 (2000 grams) was charged to the reactor along with DMC catalyst (0.48 grams) to give a final concentration of 30 ppm catalyst in the product. The reactor was inerted with nitrogen and heated to 145° C. The system was vacuum stripped for 30 minutes at 145° C. with a nitrogen purge. The nitrogen purge was stopped and the reactor was blocked in under vacuum, maintaining the reactor temperature at 145° C., propylene oxide (100 grams) was added to activate the catalyst.

After the reactor pressure decreased, the PO feed was restarted and ramped to the final feed rate. The max PO feed rate was 70.9 grams/min. After 125 grams of PO had been fed, propylene glycol was started at a feed rate of 1.65 g/min. After 1194 grams of PO was fed, the glycerin feed containing 1500 ppm water and 240 ppm phosphoric acid was started at a feed rate of 12.15 g/min. The pressure at the start of the glycerin feed was 10 psia. The pressure increased and then leveled off at 25 psia over 40 minutes. The PG feed stopped when the target amount was reached (123 grams). After a total feed time of 85 minutes or 5300 grams of PO (out of a planned oxide addition amount of 12153 g), the pressure starting increasing over the next 30 minutes to reach a pressure of 75 psia, at which point the feeds were stopped, the oxide lines were purged with nitrogen into the reactor, and the batch was abandoned owing to high reactor pressure.

Example 3

Alkoxylation Temperature 145° C. Initially, 130° C. Thereafter

The reactor system was purged with nitrogen and evacuated, then Polyol 1 (2000 grams) was charged to the reactor along with DMC catalyst (0.48 grams) to give a final concentration of 30 ppm catalyst in the product. The reactor was inerted with nitrogen and heated to 145° C. The system was vacuum stripped for 30 minutes at 145° C. with a nitrogen purge. The nitrogen purge was stopped and the reactor was blocked in under vacuum, maintaining the reactor temperature at 145° C., propylene oxide (100 grams) was added to activate the catalyst.

After the reactor pressure decreased, the PO feed was restarted and ramped to the final feed rate. The max PO feed rate was 70.9 grams/min. After 125 grams of PO had been fed, propylene glycol was started at a feed rate of 1.65 g/min. After 1194 grams of PO was fed, the glycerin feed containing 1500 ppm water and 240 ppm phosphoric acid was started at a feed rate of 12.15 g/min. The pressure at the start of the glycerin feed was 10 psia. After 50 minutes of oxide feed, the temperature was ramped down in a linear fashion over 15 minutes to 130° C. The pressure remained steady at 35 psia for the remainder of the PG (123 grams), glycerin (1724 grams) and PO feeds (12153 grams). At the end of the PO feed, the oxide lines were purged with nitrogen into the reactor. The final pressure in the reactor at the end of the oxide feeds was 37 psia and this cooked down to 15 psia for 22 minutes.

The final product had a hydroxyl number of 243 mg KOH/g and a viscosity of 267 cSt at 25° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A semi-batch process for the production of a polyoxyalkylene polyether polyol having an OH number of from 112 to 400, comprising:
    (1) establishing oxyalkylation conditions in an oxyalkylation reactor in the presence of a double metal cyanide catalyst;
    (2) continuously introducing alkylene oxide and a low molecular weight starter into said reactor, said starter consists essentially of ethylene glycol, propylene glycol, glycerine, 1,3-butanediol, 1,4-butanediol, dipropylene glycol, trimethylolpropane, pentaerythritol, sorbitol, ethanol, propanol, butanol, or combinations thereof; and
    (3) recovering an oxyalkylated polyether polyol from the reactor;
    wherein said oxyalkylation initially occurs at and is maintained at a temperature of from greater than about 1351 to about 1501 for up to a bout 60 minutes and for between 10% and 50% of the total oxide feed amount, and then continuing the oxyalkylation at a temperature in the range of from 120° C. to 130° C.

2. The process of claim 1, wherein said oxyalkylation at higher temperature occurs for between 10% and 40% of the total oxide feed amount.

3. The process of claim 1, wherein said polyoxyalkylene polyether polyol has a hydroxyl number in the range of from 125 to 350.

4. The process of claim 1, wherein said oxyalkylation at the lower temperature continues at least until the CAOS feed is substantially complete.

5. The process of claim 1, wherein the low molecular weight starter consists essentially of glycerin.

6. The process of claim 1, wherein the said low molecular weight starter consists essentially of glycerin containing from 500 to 2500 ppm water.

7. The process of claim 1, wherein the double metal cyanide catalyst concentration in the final product is between 0.002 and 0.02 wt. %, based on the amount of polyoxyalkylene polyether product.

8. The process of claim 1, wherein said polyoxyalkylene polyether polyol has a hydroxyl number in the range of from 150 to 350.

9. The process of claim 1, wherein the temperature at which said oxyalkylation initially occurs at and is maintained at is reduced by at least 10° C. during the course of the low molecular weight starter feed.

* * * * *

UNITED STATES PATENT AND TRADEMARK OFFICE
CERTIFICATE OF CORRECTION

PATENT NO. : 10,669,368 B2  
APPLICATION NO. : 13/836114  
DATED : June 2, 2020  
INVENTOR(S) : Edward P. Browne and Jose Pazos It is certified that error appears in the above-identified patent and that said Letters Patent is hereby corrected as shown below:

In the Claims

In Column 10, Claim 1, Line 23, delete "1351 to about 1501 for up to a bout 60 minutes" and replace with "135°C to about 150°C for up to about 60 minutes"

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*